Nov. 30, 1948.   F. J. GRISANTI   2,454,870
APPARATUS FOR USE IN APPLYING WIRE TO ROWS OF PLANTS
Filed Dec. 26, 1947   2 Sheets-Sheet 1
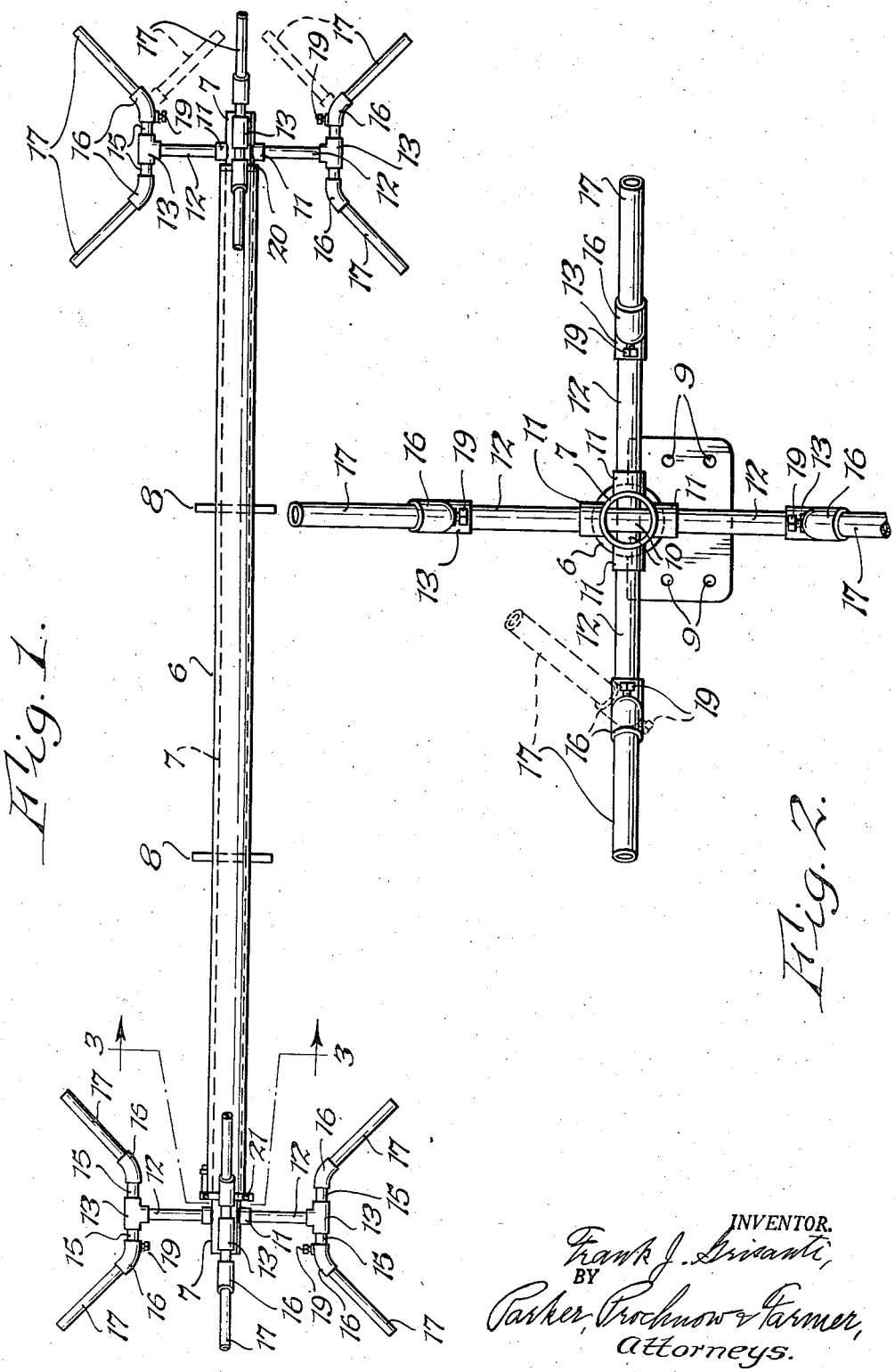
INVENTOR.
Frank J. Grisanti,
BY
Parker, Prochnow & Farmer,
Attorneys.

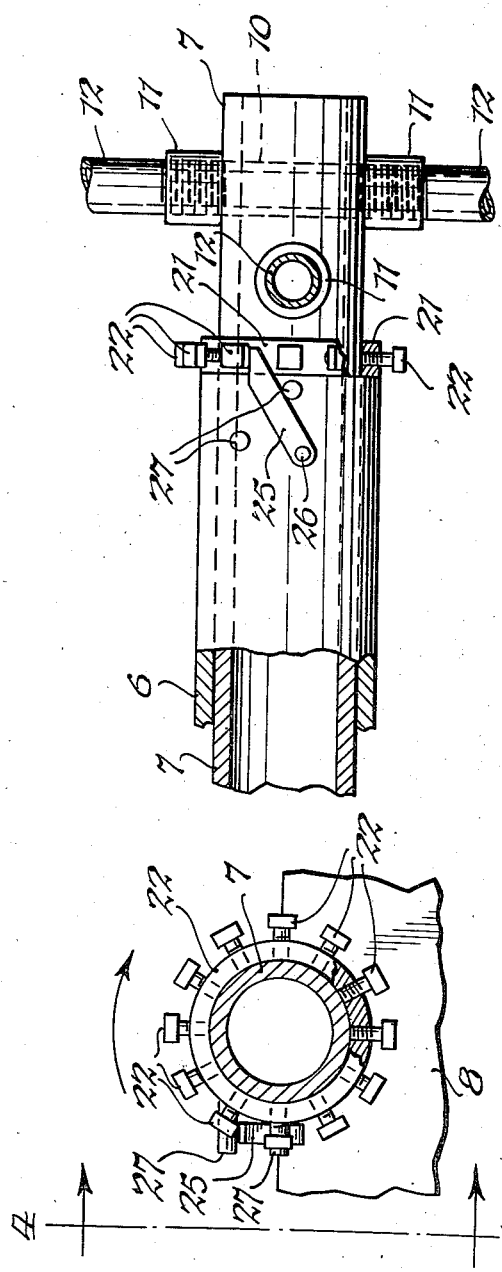

Patented Nov. 30, 1948

2,454,870

UNITED STATES PATENT OFFICE 2,454,870

APPARATUS FOR USE IN APPLYING WIRE TO ROWS OF PLANTS

Frank J. Grisanti, Forrestville, N. Y.

Application December 26, 1947, Serial No. 793,974

6 Claims. (Cl. 242—95)

This invention relates to improvements in apparatus for use in connection with the stringing of wires from pole to pole, and more particularly to the securing of wires to poles for use in connection with the supporting of plants, such as vines, shrubs or the like.

One of the objects of this invention is to provide apparatus which may be readily mounted on a vehicle and by means of which the wires for two rows of plants may be strung and applied to their posts during one passage of a vehicle between two rows of shrubs or plants. Another object of this invention is to provide apparatus of this type by means of which two coils of wire may be simultaneously supported on a vehicle in such a manner that the wires may be readily applied to the posts in two rows. A further object is to provide a device of this kind of inexpensive and simple construction on which the coils of wire can readily be positioned or removed. Other objects and advantages of this construction will appear from the following description and claims.

In the accompanying drawings:

Fig. 1 is an elevation showing my improved apparatus for supporting a pair of reels.

Fig. 2 is an end view thereof, on an enlarged scale, partly broken away.

Fig. 3 is a fragmentary sectional elevation thereof, on a still larger scale, on line 3—3, Fig. 1.

Fig. 4 is a fragmentary elevation, partly in section, showing one end of the mechanism.

My improved apparatus as illustrated by way of example in the accompanying drawings includes an outer stationary tube or pipe 6 in which a tube 7 of smaller diameter is rotatably arranged. The outer stationary tube 6 is provided with suitable brackets 8, which may be in the form of plates welded or otherwise secured to the outer tube 6, and which may be releasably bolted or otherwise secured to a vehicle or on a part carried by the vehicle, and for this purpose, the plates or brackets 8 are provided with bolt holes 9, through which the fastening bolts may be passed. These plates in the construction shown extending crosswise of the outer stationary tube or pipe 6, but any other means for securing the outer tube or pipe to a vehicle may be provided, if desired.

The inner tube 7 is longer than the outer or stationary tube and projects beyond the opposite ends thereof, as clearly shown in Fig. 1, and suitable reels for holding coils of wire are secured to the ends of the inner tube. These reels are preferably also of pipe construction so that they can be readily assembled and also can be taken apart for storage of the apparatus when the same is not in use. In the construction illustrated by way of example, the inner tube or pipe 7 is provided at opposite ends with transversely extending holes through which short tubes 10 threaded on their ends, extend, with their threaded ends extending outwardly beyond the tube 7. Internally threaded pipe couplings 11 are then screwed on the outwardly projecting ends of the tubes 10, with their ends engaging the tube 7. Short lengths of pipe 12 having their ends threaded are screwed into the outer ends of the couplings 11 and constitute spokes of the reels and extend substantially perpendicular to the axis of the inner tube 7. The outer ends of the spokes or short tubes 12 are also threaded and T-shaped couplings 13 are applied to the outer ends of the spoke tubes 12. Each T-coupling also has a pair of short tubes 15 secured thereto which extend substantially parallel to the axis of the tube 7 and angle couplings 16 are secured to the outer threaded ends of the short tubes 15 and these angle couplings receive tubes or arms 17 which extend outwardly at an angle with reference to the short tubes 15. Preferably four outwardly extending spoke members 12 are provided and arranged in two pairs, and the spoke members of one pair are arranged approximately at a right angle to the other pair. The short pipes 10 for one pair of spokes 12 is preferably spaced lengthwise of the tube 7 so that each pipe 10 may be passed through its holes in the tube 7 without interfering with the other pipe 10 of a reel and so that no material weakening of the tube 7 will result from the drilling of four holes therein to receive the short pipes 10.

As clearly shown in Fig. 1, the tubes 17 form the opposite sides of a reel for supporting a coil of wire and in order to make it possible to position a coil of wire to the reel, those arms 17 and the angle couplings 16 to which they are connected which extend outwardly beyond the ends of the inner tube 7 are preferably mounted so that they can be swung from the full line position shown in Fig. 1 into the dotted line positions shown at the right hand side of Fig. 1. When the arms 17 are in these positions, it will be obvious that a coil of wire may easily be placed on a reel. After the coil of wire has been so positioned, the arms 17 may be swung from the dotted line positions shown into the full line positions, thus holding the coil securely on the reel. The angle couplings 16 may be swung into and out of their operative positions on threaded connections with the short tubes 15 and may be frictionally held in their operative positions. Preferably, however, each angle coupling 16 is also provided with a threaded hole in which a set screw 19 may engage for securing the arms 17 in their operative positions.

Means are provided for limiting the endwise movement of the inner tube 7 with reference to the outer stationary tube 6, and in the construction shown for this purpose, a sleeve 20 is provided at one end of the tube 6 which may be bolted, welded or otherwise secured to the tube 7. At the other end of the apparatus, the tube 7 is provided with a ring or sleeve 21, see Figs. 1, 3 and 4, which is secured to the inner tube 7 by means of a plurality of bolts or screws 22. By means of this construction, the inner tube may be held against excessive endwise movement while rotating within the outer stationary tube 6.

The length of the outer stationary tube 6 is such that the reels described will be spaced apart at a distance equal to the distance between rows of plants or shrubs which the wire is intended to support. The device described is, consequently, mounted on a vehicle (not shown), such as a wagon, truck or tractor, which is then driven in the middle of the two rows to which the wires are to be applied. Preferably, the vehicle may also be used to carry posts which may readily be driven into the ground manually between plants of the rows and to which the wires are secured. The vehicle is driven in advance of the posts, and when the posts are secured in the ground, the wire is secured thereto from each of the reels, whereupon the vehicle is advanced sufficiently to permit another pair of posts to be driven into the rows in rear of the reels on the vehicle. By means of this apparatus, the vehicle can, consequently, be used to transport the posts to where they are required, and also the wire so that one passage of the vehicle between two rows makes it possible for the workers to apply two strings of wire on posts over two adjacent rows of plants. The improved apparatus described preferably is arranged at such height on the vehicle that the wire as it is removed from the coils on the reels will be at about the level above the ground at which it is to be applied to the posts. In the case of grapes or other plants, which grow to greater heights in successive years, and which require a second string of wire above the first string after a year or two, the apparatus may be mounted on the vehicle at a greater height, preferably such that the reels will be above the upper ends of the posts, whereupon the vehicle is advanced along the space between two rows of plants, bushes or vines, and the wires from the two reels may be secured to the posts above the lower wires.

Means are preferably also provided for holding the reels and the central tube 7 against turning so that by advancing the vehicle, while the inner tube 7 is locked against rotation, tension may be applied to the wire to take up slack in the same or to tightly stretch the same from post to post. Any suitable means may be provided for this purpose, and in the construction shown, I have provided a ratchet cooperating with a dog or a latch to releasably hold the inner tube 7 against turning. This dog may be pivotally mounted on the outer stationary tube 6 in any suitable manner, for example, by pivoting the same to swing about a pin or pivot member 26 secured to and extending outwardly from the outer or stationary tube 6.

In the construction shown for this purpose, I have provided the ring 21 with a series of screws 22 for locking the ring in place and the heads of these screws which extend beyond the outer periphery of the ring 21 may be used as ratchet teeth for cooperation with a dog or latch 25 pivoted on the outer tube 6 near the end thereof. This outer tube may also be provided with a pair of outwardly extending pins or pegs 27, see particularly Figs. 3 and 4, which limit the movement of the dog or latch 25. When the dog 25 is in the position shown in Fig. 4, the end portion thereof will engage the heads of the screws 22 to hold the inner tube 7 against rotation. When the dog 25 is moved about its pivot 26 into engagement with the post 27, the dog will be out of the path of movement of the bolts 22 on the ring 21, and thus permit the inner tube 7 to rotate within the stationary outer tube 6. Any other means for releasably holding the tube 7 against rotation may be provided, if desired.

In the use of the latch described, the vehicle may be advanced to feed out approximately the desired length of wire from the coils on the reels, and when this amount of wire has been uncoiled, the latch may be moved into operative position so that upon farther advance of the vehicle, tension will be applied to the wires so that they may be readily supported in operative relation to the posts to which they are to be secured. The dog or latch 25 may then be moved out of its operative position or into engagement with the post 27 to release the reels so that additional wire may be fed from the same.

By means of the construction described, a pair of wires may be simultaneously fed to two adjacent rows of plants in such a manner that the wire will be above the rows when the vehicle is driven along the middle portion of the space between rows. This greatly facilitates the applying of the wires to the posts. The apparatus can be readily constructed without requiring expensive equipment to produce the same, and the apparatus can also be easily taken apart for storage or shipment.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. An apparatus for use in applying two wires to two adjacent rows of plants, including an outer stationary tube, means for mounting said tube on a vehicle, an inner tube rotatably mounted within said outer tube and having its ends extending beyond the ends of the outer tube, collars secured to said inner tube at the ends of said outer tube to limit the longitudinal movement of said inner tube relatively to said outer tube, reels mounted on the ends of the inner tube beyond the ends of the outer tube in position to discharge wire from coils mounted on said reels above said rows of plants, the length of said tubes being such that said reels will be spaced apart a distance substantially equal to the distance between the rows of plants.

2. Apparatus according to claim 1, characterized in that said reels include spoke members having a threaded connection with the inner tube and extending outwardly therefrom.

3. Apparatus according to claim 1, characterized in that locking means are provided for holding the inner tube against rotation relatively to the outer tube for enabling the wires over said rows to be stretched when said tubes are held against relative rotation and when the vehicle is advanced.

4. Apparatus according to claim 1, characterized in that one of said collars is provided with a plurality of clamping screws arranged about said ring with their heads extending beyond the outer surface of said ring, and a latch mounted on said outer stationary tube and movable into and out of a position to engage the heads of said screws for holding the inner tube against rotation.

5. An apparatus for stringing wires over rows of plants, including an outer stationary tube, brackets on said tube adapted to be secured to a vehicle for mounting said tube thereon while extending crosswise of the length of the vehicle, an inner tube rotatably mounted within said outer tube and having the opposite ends thereof extending beyond the ends of said outer tube, collars secured on said inner tube at the ends of said outer tube for limiting the movement of said inner tube in the direction of its length relatively to said outer tube, reels mounted on the portions of said inner tube which project beyond said outer tube and each including pipes extending through holes in said inner tube and extending crosswise of the axis of said inner tube and having their ends threaded and extending beyond the surface of said inner tube, pipe couplings screwed on said threaded ends of said pipes, tubular spoke members having threaded engagement with said couplings and extending radially with reference to the axis of said inner tube, T-couplings secured to the ends of said spoke members, pipes having threaded engagement with said T-couplings and extending substantially parallel to the axis of said inner tube, angle couplings secured to the ends of said last mentioned tubes, and side members for said reel formed of tubes having threaded engagement with said angle couplings.

6. An apparatus for stringing wires over rows of plants, including an outer stationary tube, brackets on said tube adapted to be secured to a vehicle for mounting said tube thereon while extending crosswise of the length of the vehicle, an inner tube rotatably mounted within said outer tube and having the opposite ends thereof extending beyond the ends of said outer tube, collars secured on said inner tube at the ends of said outer tube for limiting the movement of said inner tube in the direction of its length relatively to said outer tube, reels mounted on the portions of said inner tube which project beyond said outer tube and each including pipes extending through holes in said inner tube and extending crosswise of the axis of said inner tube and having their ends threaded and extending beyond the surface of said inner tube, pipe couplings screwed on said threaded ends of said pipes, tubular spoke members having threaded engagement with said couplings and extending radially with reference to the axis of said inner tube, T-couplings secured to the ends of said spoke members, pipes having threaded engagement with said T-couplings and extending substantially parallel to the axis of said inner tube, angle couplings secured to the ends of said last mentioned tubes, and side members for said reel formed of tubes having threaded engagement with said angle couplings, the side members of said reels at the outer ends of said reels and the angle couplings connected therewith being movable into positions in which they extend outwardly with reference to the axis of said inner tube for holding coils of wire on said reels, and into positions in which they extend toward the axis of said inner tube to permit coils of wire to be placed on said reels.

FRANK J. GRISANTI.

No references cited.